US009985782B2

(12) United States Patent
McCallum

(10) Patent No.: US 9,985,782 B2
(45) Date of Patent: May 29, 2018

(54) NETWORK BOUND DECRYPTION WITH OFFLINE ENCRYPTION

(71) Applicant: Red Hat, Inc., Raleigh, NC (US)

(72) Inventor: Nathaniel McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 167 days.

(21) Appl. No.: 14/950,681

(22) Filed: Nov. 24, 2015

(65) Prior Publication Data

US 2017/0149564 A1 May 25, 2017

(51) Int. Cl.
H04L 29/06 (2006.01)
H04L 9/08 (2006.01)
G06F 21/62 (2013.01)

(52) U.S. Cl.
CPC ........ H04L 9/0894 (2013.01); G06F 21/6209 (2013.01); H04L 9/0822 (2013.01); H04L 9/0825 (2013.01)

(58) Field of Classification Search
CPC ... H04L 9/0894; H04L 9/0822; H04L 9/0825; H04L 63/062; H04L 9/008; H04L 9/083; G06F 21/62
USPC ........................................................ 380/286
See application file for complete search history.

(56) References Cited

U.S. PATENT DOCUMENTS

| | | | |
|---|---|---|---|
| 6,819,766 B1 | 11/2004 | Weidong | |
| 6,845,160 B1 * | 1/2005 | Aoki | H04L 63/0428 380/279 |
| 7,155,616 B1 | 12/2006 | Hamlin | |
| 7,454,021 B2 | 11/2008 | Reddy et al. | |
| 8,190,921 B1 | 5/2012 | Harwood et al. | |
| 8,837,734 B2 | 9/2014 | McCallum | |
| 2012/0179904 A1 | 7/2012 | Dunn et al. | |
| 2013/0167200 A1 | 6/2013 | Birch et al. | |
| 2014/0079221 A1 * | 3/2014 | McCallum | H04L 9/0822 380/277 |
| 2014/0181514 A1 | 6/2014 | Aoyagi et al. | |
| 2015/0074425 A1 | 3/2015 | Griffes et al. | |
| 2017/0063531 A1 * | 3/2017 | Sullivan | G06F 21/40 |

FOREIGN PATENT DOCUMENTS

JP      2003208355 A2      7/2003

OTHER PUBLICATIONS

"AWS Key Management Service", amazon.com, 6 pages https://aws.amazon.com/kms/ (Last accessed Jan. 7, 2016).

Chow, Sherman S.M. et al., "Identity-Based Online/Offline Key Encapsulation and Encryption", Department of Computer Science, Courant Institute of Mathematical Sciences, New York University, NY, USA 13 pages http://dl.acm.org/citation.cfm?id=1966922.

* cited by examiner

Primary Examiner — Yogesh Paliwal
(74) Attorney, Agent, or Firm — Lowenstein Sandler LLP

(57) ABSTRACT

A method relates to receiving, by a processing device, a first request to decrypt encrypted data stored on an encrypted portion of a drive, transmitting, to a decryption server, a second request comprising an encrypted first encryption key, wherein the encrypted first encryption key is produced by encrypting a first encryption key using a public key of an asymmetric key pair, receiving the first encryption key from the decryption server, decrypting an encrypted second encryption key using the first encryption key to produce a second encryption key, and decrypting the encrypted data using the second encryption key to produce data.

20 Claims, 5 Drawing Sheets

NETWORK BOUND DECRYPTION WITH OFFLINE ENCRYPTION

TECHNICAL FIELD

This disclosure relates to decrypting encrypted data stored on a data drive, and in particular, to a system and method to acquire a key encryption key (KEK) through a decryption server for the data decryption.

BACKGROUND

Data stored in data storage devices such as a data drive (or a disk drive) is often stored in an encrypted format for security purposes. Current data decryption schemes require a user to enter a password whenever the storage device is mounted to a mounting point of a computer system such as a client device. The data drive may be mounted at the boot of the computing system or responsive to a mount command issued by a user of the computer system. This manual entry of the password can be a bottleneck for datacenters where data drives are frequently mounted.

BRIEF DESCRIPTION OF THE DRAWINGS

The present disclosure is illustrated by way of example, and not by way of limitation, in the figures of the accompanying drawings.

DETAILED DESCRIPTION

Key Distribution Server (KDS) is a centralized server that can be used to host all of the passwords used for data decryption. A client device can request the password associated with the client device from the KDS, and use the password as a key for the data decryption. In this type of implementations, the KDS needs to keep and update a password record containing passwords associated with all authenticated client devices. Because the KDS stores all of the passwords, the KDS can become a single attack point that holds all critical information.

Aspects of the present disclosure address the above noted and other deficiencies by providing systems and methods that include a decryption server from which a client device may acquire a key encryption key (KEK) that may be used to decrypt encrypted data stored on a data drive. The KEK may be used to decrypt an encrypted disk encryption key (E-DEK). In response to generating the disk encryption key (DEK), the client device may use the DEK to decrypt the encrypted data stored on a data drive associated with the client device. Thus, implementations of the present disclosure can decrypt the encrypted data without the need to transmit the DEK over a network. Further, implementations of the present disclosure may perform data encryption and the encryption of the DEK offline (i.e., without the need to access the decryption server). The offline encryptions may be performed by another party separate from the client device, thus releasing the client device from the burden to perform online encryptions. The decryption server may be implemented as a stateless machine (i.e., the decryption server does not, in itself, store information associated with the data encryption or decryption). Thus, the stateless decryption server is not a critical information storage that is vulnerable to attacks. Implementations of the present disclosure assume that an entity that has the access to the KEK is also authorized to access the encrypted data, and thus do not apply access control to the entity when it attempts to decrypt the encrypted data.

Figure 1:
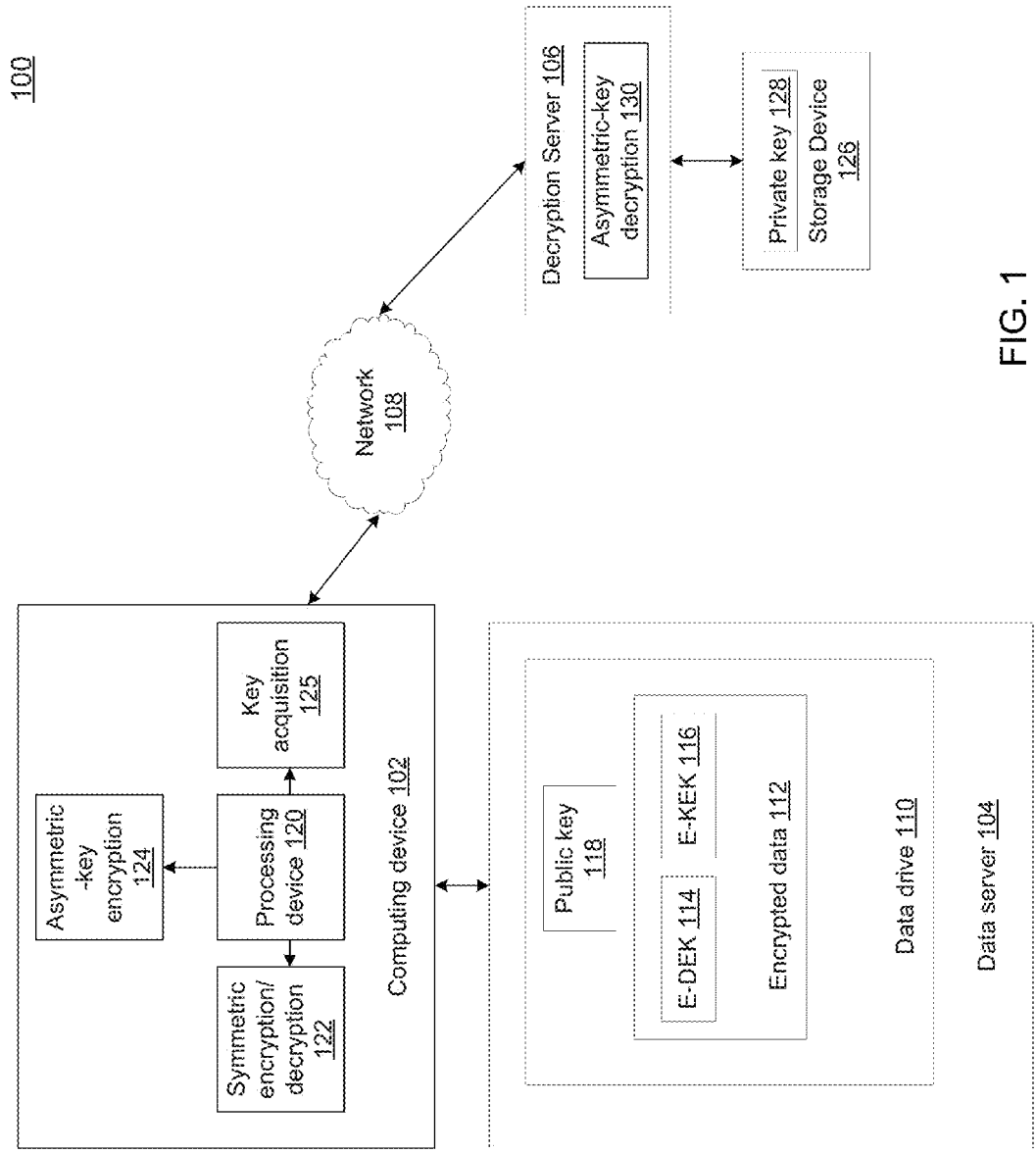
FIG. 1 illustrates a system to decrypt encrypted data stored on a data drive according to an implementation of the present disclosure.

FIG. 1 illustrates a system 100 to decrypt encrypted data stored on a data drive according to an implementation of the present disclosure. As shown in FIG. 1, system 100 may include a computing device 102, a data server 104, and a decryption server 106. Computing device 102 may be computing systems including such as, for example, a computer, a tablet computer, or a smart phone. In one implementation, computing device 102 may be a client device that relies on data server 104 to provide data services. Computing device 102 may include a processing device 120 which may be a hardware processor (such as a central processing unit (CPU) or a graphics processing unit (GPU)) that may be programmed to execute software applications including operations to perform different types of encryption and decryption schemes. Data server 104 may be a computing device that serves data stored on data drive 110 to computing device 102. The data stored on data drive 110 can be application programs and data associated with these applications programs. In one implementation, data drive 110 may include an encrypted portion to store encrypted data 112. Decryption server 106, operably connected to computing device 102 via a network 108, may be another server device that is implemented with a decryption module to provide decryption services to computing device 102.

Computing device 102 may be coupled to data server 104 via a public or private network 108. In one implementation, computing device 120 may be part of data server 104. In another implementation, computing device 120 is a client device that resides separately from data server 104. Data server 104 may be part of a data center that is a facility used to house one or more data servers and associated equipment such as networking equipment to connect data server 104 to computing device 102. In one implementation, data server 104 may further include data drive 110 that is a storage device (such as a disk drive) used to store data. In one implementation, for security reasons, an encrypted portion of data drive 110 may be used to store encrypted data 112.

Processing device 120 may execute a software application to encrypt data using a disk encryption key (DEK) to produce encrypted data 112 and store the encrypted data 112 on the encrypted portion of data drive 110. Data encryption is a process to convert data (e.g., plain text data) into encrypted data (e.g., cipher-text) using an encryption key, whereas the encrypted data is scrambled data (or cipher) that is incomprehensible to human readers. The encrypted data, however, can be converted back to the original data through decryption using a decryption key. The encryption and decryption keys may be alphanumerical strings of certain length such as, for example, a password that is selected by a user or generated by a key-generator software application.

The encryption can be achieved with encryption schemes suitable for data encryption, including, for example, the Advanced Encryption Standard (AES) scheme and the Camellia scheme. In one implementation, processing device 120 may execute a symmetric-key encryption/decryption module 122 using the data encryption key (DEK) to encrypt data, whereas symmetric-key encryption/decryption module 122 may implement a symmetric-key encryption/decryption algorithm that uses the data encryption key (DEK) to encrypt data into encrypted data 112 and uses the same DEK to decrypt encrypted data 112 into the original data. The restored data may be stored in a memory associated with processing device 120 without written to data drive 110. Thus, a single DEK is used for both encryption and decryption of the data. The symmetric-key encryption/decryption module 122 may include both encryption and decryption operations.

In one implementation, to protect DEK from unauthorized access, processing device 120 may further encrypt DEK into an encrypted DEK (E-DEK) 114 using a key encryption key (KEK). Similar to the encryption of data into encrypted data 112, processing device 120 may execute symmetric-key encryption/decryption module 122 using the KEK to encrypt DEK, produce E-DEK 114 and store E-DEK 114 on data drive 110. Similarly, processing device 120 may execute symmetric-key encryption/decryption module 122 using the KEK to decrypt E-DEK 114 to restore DEK, and processing device 120 may execute symmetric-key encryption/decryption module 122 using the DEK as the key to decrypt encrypted data 112 to restore the original data.

In one implementation, to further protect the KEK from unauthorized access, processing device 120 may further execute an asymmetric-key encryption module 124 to encrypt the KEK into an encrypted KEK (E-KEK) 116 using a public key 118 of an asymmetric key pair, whereas the asymmetric-key encryption module 124 may implement an asymmetric-key encryption algorithm that uses the public key to encrypt the KEK into E-KEK 116 and uses a private key 128 of the asymmetric key pair to decrypt E-KEK 116 to restore the KEK. In one implementation, processing device 120 may store E-KEK 116 on data drive 110. In contrast, as shown in FIG. 1, computing device 102 and processing device 104 do not have access to private key 128. Instead, private key 128 is stored separately in a secured storage device 126 accessible by decryption server 106.

In one implementation, the asymmetric key pair including the public/private keys is associated with an identifier of computing device 102. Thus, each computing device served by decryption server 106 may be identified by the identifier of the computing device. In another implementation, the public key/private key pair is associated with an identifier of a user account of computing device 102. Thus, each user account served by decryption server 106 may be identified by the identifier of the user account. In this way, decryption server 106 may search for private key 128 stored in storage device 126 in view of the identifier that is associated with a computing device or a user account.

In one implementation, decryption server 106 is implemented with an asymmetric-key decryption module 130 to provide decryption services to one or more computing devices including computing device 102. As shown in FIG. 1, computing device 102 may perform encryption of DEK using a key encryption key (KEK) to generate an encrypted DEK (E-DEK) and perform encryption of KEK using public key 118 of an asymmetric encryption key pair. E-DEK 114 and E-KEK 116 may be stored on data drive 110 accessible by computing device 102. In one implementation, the encryption of the DEK and encryption of the KEK may be performed as offline operations (e.g., by a third party before an entity starts to use the client device 102 for data decryption). Data drive 110 may also store encrypted data 112 that need to be decrypted by computing device 102. For security reasons, processing device 120 may delete or discard any copies of DEK or KEK, thus preventing computing device 102 from directly accessing DEK or KEK. Instead, both DEK and KEK are recovered through a key acquisition module 125 implemented on processing device 120.

Computing device 102 may receive a request to decrypt the encrypted data 112 stored on the encrypted portion of data drive 110. The request may be generated in response to the computing device 102 being booted up and data drive 110 being mounted to a mount point accessible by an operating system running on computing device 102. The request may also be generated because an application running on computing device needs to access data stored on data drive 110 in the encrypted format.

In response to receiving the request to decrypt encrypted data 112, processing device 120 may execute key acquisition module 125 to recover DEK to be used to decrypt encrypted data 112. In executing key acquisition module 125, processing device 120 may first identify an identifier associated with the requestor. The requestor can be the computing device 102 or a user account that has the permission to access encrypted data 112. Processing device 112 may retrieve E-KEK 116 from data drive 110 and then transmit, via network 108 to decryption server 106, a decryption request. In one implementation, the E-KEK 116 may be volume-specific, i.e., the E-KEK is associated with a volume in data drive 110, whereas the data in the volume is encrypted with a key encrypted by the E-KEK. The decryption request may include the identifier of the requestor and E-KEK 116, requesting decryption server 106 to perform a decryption service on E-KEK 116.

In one implementation, decryption server 106 is a device including a second processing device (such as a hardware processor) implemented thereon an asymmetric-key decryption module 130 to provide decryption services on the received E-KEK 116. In response to receiving the decryption request, the second processing device of decryption server 106 may retrieve private key 128 from storage 126, whereas private key 128 may be used to decrypt E-KEK 116 that is encrypted using public key 118. In one implementation, private key 128 may be identified and retrieved from storage device 126 based on a certificate (e.g., an X.509 certificate as describe below) that binds the public key to the identifier in the decryption request. For example, the private key 128 may be identified as the private key associated with the identifier. Using the private key 128, the second processing device of decryption server 106 may execute asymmetric-key decryption module 130 to decrypt E-KEK 116 to produce the KEK and transmit the produced KEK to computing device 102. The response to computing device 102 may also include the identifier associated with public key 118 to enable the processing device 120 to associate the KEK with the decryption service requestor (e.g., a user account that requested the key decryption service from decryption server 106).

Responsive to receiving the KEK from decryption server 106, processing device 120 of computing device 102 may execute symmetric-key encryption/decryption module 122 to decrypt E-DEK using received KEK to produce the DEK. Because decryption server 106 is a separate device to provide on-demand decryption services, client device 102 does not need to have the direct access to private key 128, thus eliminating the risk of unauthorized access to the private key 128 via client device 102. In response to producing the DEK, processing device 120 of computing device 102 may execute symmetric-key encryption/decryption module 122 to decrypt encrypted data 112 using the DEK to produce the original data. In this way, computing device 102 may restore the original data from the encrypted data 112 via the decryption services provided by decryption server 106. The decryption system 100 as shown in FIG. 1 does not need a user to provide a password. Further, decryption server 106 may be a stateless machine in the sense that decryption server 106 does not, in itself, keep a persistent copy of the private key, thus avoiding to become an attack point of all private keys. In one implementation, in response to restoring the data, the processing device may delete or destroy the DEK and KEK from any storage (such as registers, memory, and disk) associated with the processing device 120. Since this is no central key database, implementations of the present disclosure does not need to store any client-specific information other than the keys that the decryption server 106 sends to computer device 102. Since the decryption server 106 generates one KEK at a time, it cannot be attacked for all keys associated with client devices (such as computer device 102). Therefore, decryption system 100 as shown in FIG. 1 may be particularly suitable for a data center where data drive 110 may be frequently mounted to computing devices associated with the data drive 110.

Figure 2:
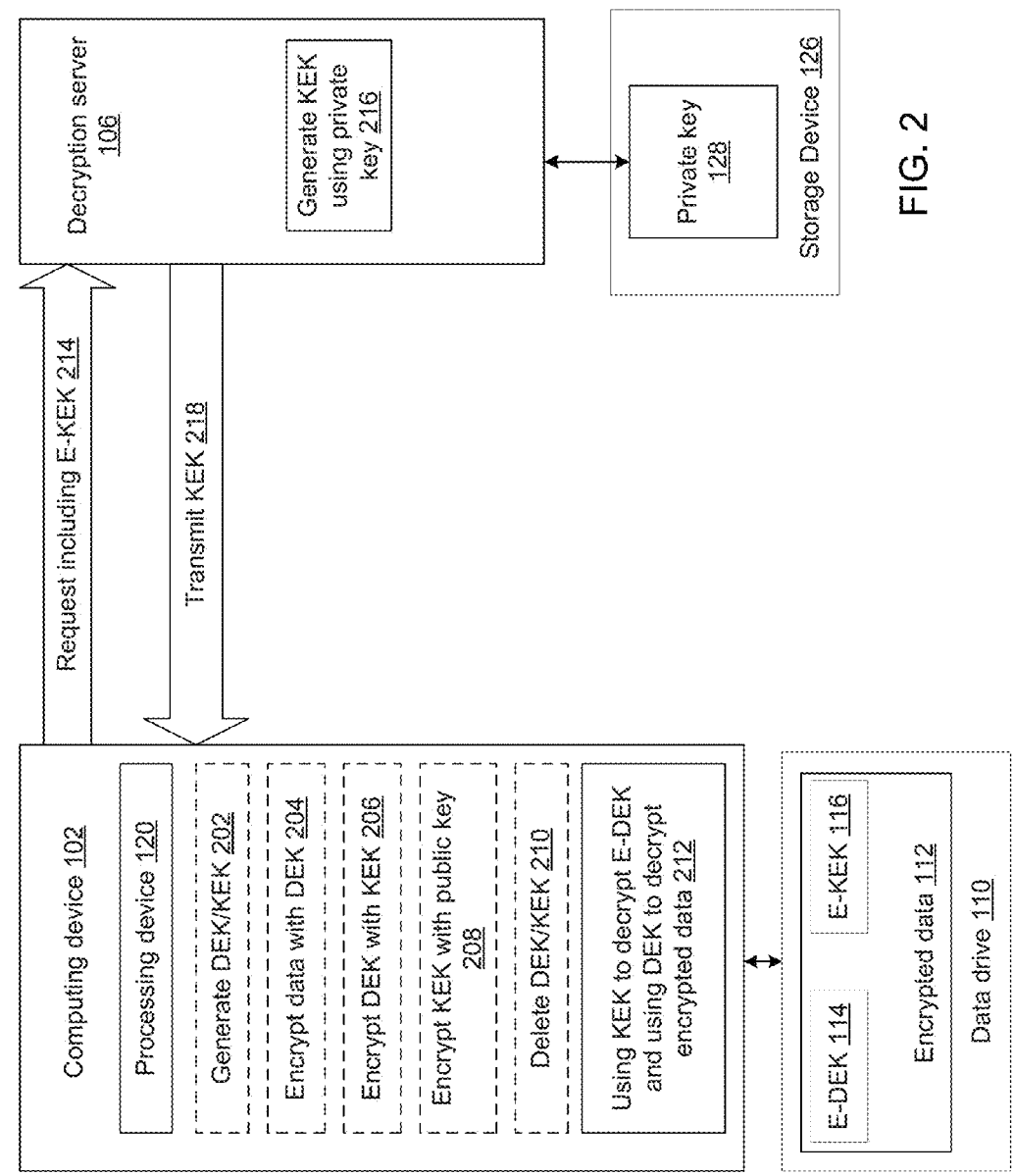
FIG. 2 illustrates a process to decrypt encrypted data stored on a data drive using a decryption server according to an implementation of the present disclosure.

FIG. 2 illustrates a process 200 to decrypt encrypted data stored on a data drive using a decryption server according to an implementation of the present disclosure. As shown in FIG. 2, computing device 102 may include processing device 120 that is programmed to perform encryption and decryption operations with respect to encrypted data 112 stored on a data drive 110. Decryption server 106 may be operably coupled to computing device 102 to provide a key decryption service to computing device 102.

In one implementation, at 202, processing device 120 may execute a key generator program (not shown) to generate a data encryption key (DEK) and a key encryption key (KEK), whereas the DEK may be used to encrypt data and KEK may be used to encrypt the DEK. The key generator program is a program that can generate a sequence of symbols (such as alphanumerical symbols) with pseudo-random characteristics according to a cryptographic protocol. Different sequences of symbols generated by the key generator can be used as the DEK and the KEK respectively.

At 204, processing device 120 may execute symmetric-key encryption/decryption module 122 to encrypt data using the DEK and store encrypted data 112 on data drive 110. For security purposes, data drive 110 does not provide computing device 102 with direct access to the original data. Instead, data drive 110 provides computing 102 with access to encrypted data 112 that may be restored to the original data format through decryption.

At 206, processing device 120 may execute symmetric-key encryption/decryption module 122 to encrypt the DEK using the previously-generated KEK to generate encrypted DEK (E-DEK) 114 and store the generated E-DEK 114 on data drive 110. Further, at 208, processing device 120 may execute asymmetric-key encryption module 124 to encrypt KEK with a public key of an asymmetric key pair to generate encrypted KEK (E-KEK) 116. Processing device 120 may also store the generated E-KEK 116 on data drive 110.

In one implementation, responsive to generating and storing E-DEK 114 and E-KEK 116 on data drive 110, at 210, processing device 120 may delete (or discard) the DEK and the KEK from computing device 102. After deleting the DEK and the KEK, computing device 102 does not have any access to these two keys. Instead, the DEK and KEK are to be restored using the decryption server. In one implementation, processing device 120 may perform operations as described in 202-210 as offline operations. The offline operations may be performed by a third party before processing device 120 attempts to decrypt the encrypted data 112. For example, processing device 120 may perform these operations as offline operations as part of the configuration process for computing device 102.

When computing device 102 is booted up, computing device 102 may need to access the original data (or the un-encrypted data). For example, during the boot of computing device 102, computing device 102 may need to mount data drive 110 to access the original data. In response to receiving a request to access the original data stored on data drive 110, processing device 120 may generate a decryption request including the E-KEK 114 and an identifier that identifies the requestor of the decryption service. The identifier may uniquely identify the computing device 102 as the requestor or uniquely identify a user account associated with computing device 102 as the requestor.

At 216, responsive to receiving the decryption request including an identifier from computing device 102, a processing device of the decryption server 106 may retrieve, from storage device 126, a private key 128. Private key 128 may have been associated with the identifier in storage device 126 and thus can be retrieved in view of the identifier. Private key 128 and public key 118 may constitute an asymmetric key pair, whereas private key 128 may be used to decrypt a cyphertext that has been encrypted using public key 118. In one implementation, X.509 certificates issued by a Certificate Authority (CA) may be used to bind public key 118 with the identifier identifying the decryption service requestor (computing device 102 or a user account). The CA may be a third party (e.g., Digicert® or Verisign®) that has been granted the authority to issue X.509 certificates according to the International Telecommunication Union/Telecommunication Standardization Sector (ITU-T) standard. An X.509 certificate issued by a CA includes the identifier (e.g., a distinguished name, an e-mail address, or a DNS entry) and the public key 118. The processing device of decryption server 106 may verify the identity of the decryption service requestor based on the X.509 certificate and identify private key 128 corresponding to public key 118 based on the identifier stored in the X.509 certificate. In response to retrieving private key 128 from storage device 126, the processing device of decryption server 106 may execute asymmetric-key decryption module 130 to decrypt E-KEK 214 received from computing device 102 using private key 128 to produce KEK.

At 218, decryption server 106 may transmit the KEK to computing device 102. In this way, computing device 102 may receive the KEK without the need to access private key 128. In response to receiving the KEK from decryption server 106, processing device 120 of computing device 102 may execute symmetric-key encryption/decryption module 122 to decrypt E-DEK 114 using the received KEK to produce the DEK. Processing device 120 may further execute symmetric-key encryption/decryption module 122 to decrypt encrypted data 112 to produce the original data for computing device 102. As such, computing device 102 may receive the requested data through the decryption process 200 without the need for a user to provide a password. The system 100 as shown in FIG. 1 and the process 200 as shown in FIG. 2 may be particularly suited to use in a cloud computing environment where data drives may need to be mounted to computing devices frequently.

Figure 3:
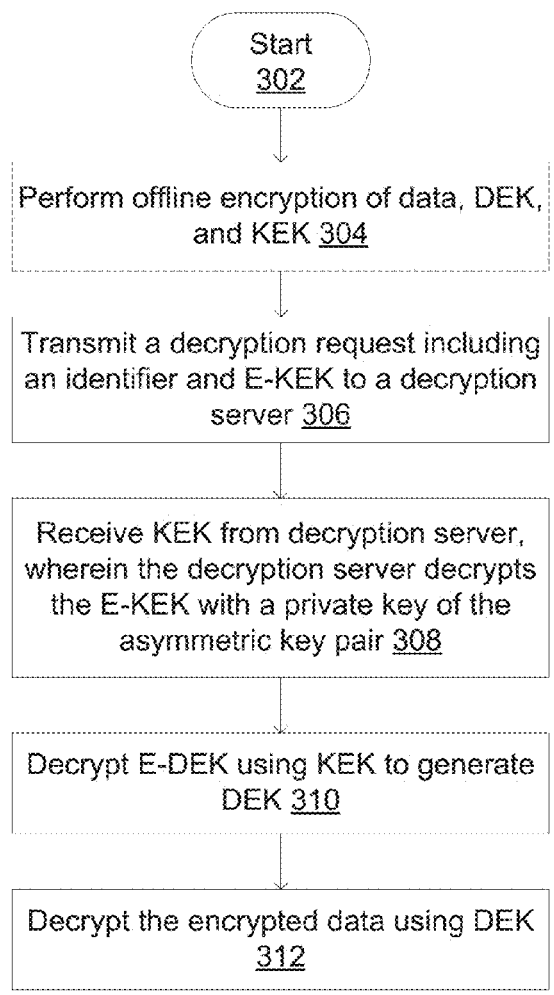
FIG. 3 is a flow diagram illustrating a method to perform decryption operations by a computing device according to some implementations of the disclosure.

FIG. 3 is a flow diagram illustrating a method 300 to perform decryption operations by a computing device according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by processing device 120 of computing device 102 as shown in FIG. 1.

Referring to FIG. 3, at 302, the processing device may receive a request to decrypt encrypted data stored on data drive and start the decryption operations. Prior to starting the decryption, at 304, processing device may have executed a symmetric-key encryption/decryption module to encrypt data using a data encryption key (DEK) and to encrypt the DEK using a key encryption key (KEK) to produce an encrypted DEK (E-DEK). Further, processing device 120 may execute an asymmetric-key encryption module to encrypt the KEK using a public key of the asymmetric-key pair to produce an encrypted KEK (E-KEK). In one implementation, the processing device may delete DEK and KEK and make them unavailable to the processing device. Thus, to access the data in its un-encrypted format, the processing device needs to perform the decryption operations as described below. In one implementation, the encryption of data, DEK and KEK may be performed as offline operations (i.e., not part of the decryption process by the processing device).

At 304, the processing device may receive a request to access the data that is stored in the encrypted format in an encrypted portion of a data drive. In response to receiving the request, the processing device may transmit a decryption request to a decryption server. The decryption request may include the E-KEK associated with encrypted data and an identifier that identifies a requestor of the decryption service. The identifier may link the requestor to a private key that is accessible by the decryption server.

At 308, the processing device may receive a response from the decryption server where the decryption server has attempted to decrypt E-KEK on behalf of the processing device. In one implementation, the decryption server has successfully decrypt E-KEK using the private key of the asymmetric key pair and transmit the KEK to the computing device for further decryption operations. Alternatively, if the decryption server cannot decrypt the E-KEK for some reasons (e.g., decryption server cannot find a matching private key), the decryption server may transmit a failed-to-decrypt indicator to the processing device.

At 310, in response to receiving the KEK from decryption server, the processing device of the computing device may execute the symmetric encryption/decryption module using the received KEK to decrypt the E-DEK to produce the DEK. Further, at 312, in response to producing the DEK, the processing device of the computing device may execute the symmetric encryption/decryption module using the DEK to decrypt the encrypted data to restore the original data for the computing device. The restored original data may be stored in a memory associated with the processing device.

Figure 4:
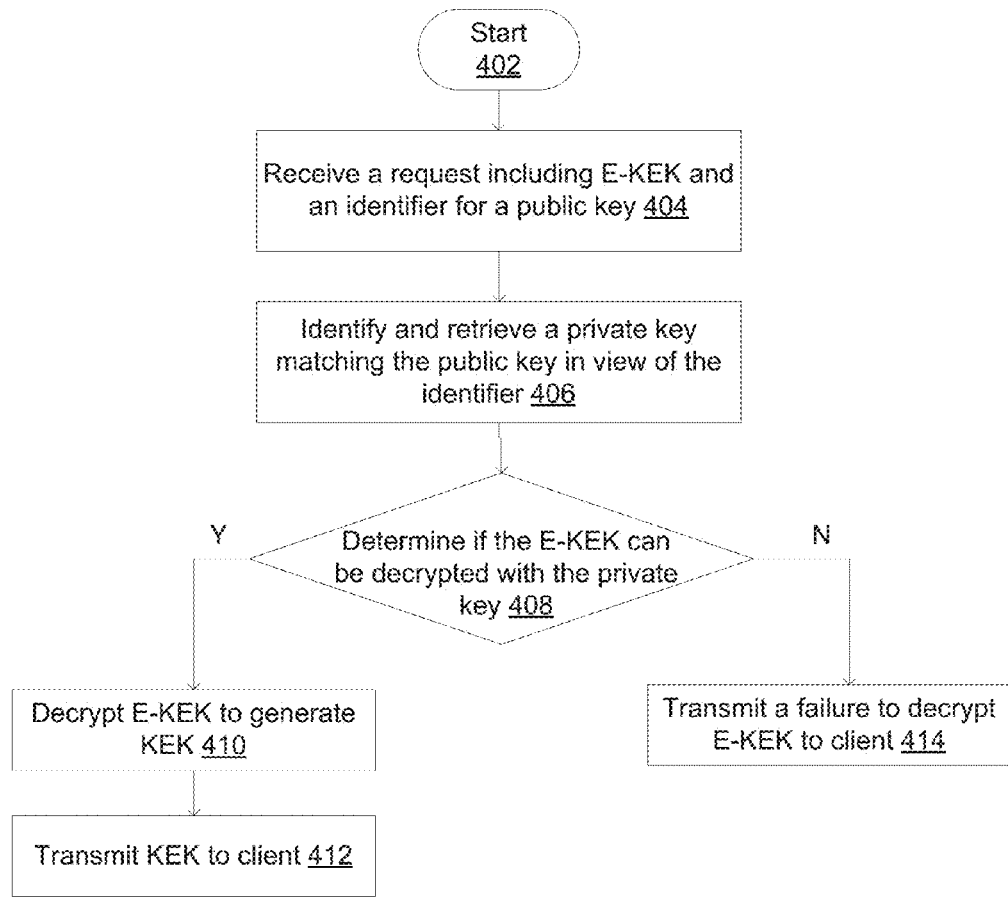
FIG. 4 is a flow diagram illustrating a method to perform decryption services by a decryption server according to some implementations of the disclosure.

FIG. 4 is a flow diagram illustrating a method 400 to perform decryption services by a decryption server according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by processing device of decryption server 106 as shown in FIG. 1.

Referring to FIG. 4, at 402, the processing device of the decryption server may start the decryption server to provide key decryption services to computing devices. At 404, the processing device of the decryption server may receive a decryption request from a computing device. The decryption request may include the E-KEK for which the decryption service is requested. The decryption request may also include an identifier that may be used to identify and retrieve a private key.

At 406, the processing device of the decryption server may identify and retrieve a private key from a secured storage in view of the identifier. The identifier may be associated with the public key that is used to encrypt the KEK.

At 408, the processing device of the decryption server may determine whether the E-KEK can be decrypted using the private key. In one implementation, the E-KEK may be properly decrypted if it has been encrypted with a public key that supported by the decryption server and the computing device.

At 410, if the processing device of the decryption server determines that the E-KEK can be decrypted using the private key, the processing device may execute an asymmetric-key decryption module to decrypt the E-KEK using the retrieved private key to produce the KEK for the computing device. At 412, the processing device of the decryption server may transmit the KEK to the computing device.

However, if the processing device of the decryption server determines that the E-KEK cannot be decrypted using the private key, at 414, the processing device may transmit a fail-to-decrypt indicator to the processing device.

Figure 5:
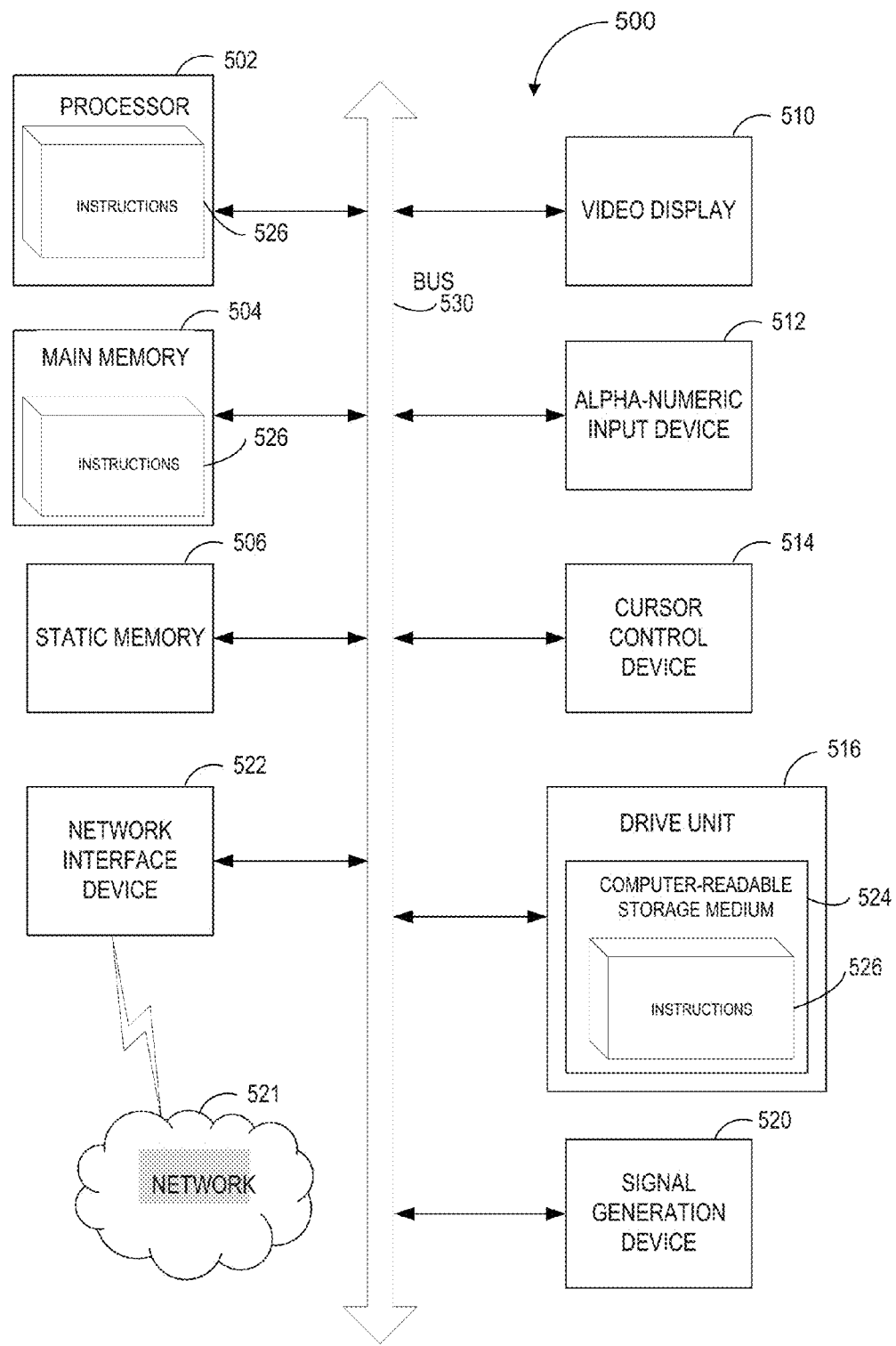
FIG. 5 is a block diagram illustrating an exemplary computer system according to an implementation of the present disclosure.

FIG. 5 illustrates a diagrammatic representation of a machine in the exemplary form of a computer system 500 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein (e.g., instructions of the routing application 122). The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a processing device, a first request to decrypt encrypted data stored on an encrypted portion of a drive;
    transmitting, to a decryption server, a second request comprising an encrypted first encryption key, wherein the encrypted first encryption key is produced by encrypting a first encryption key using a public key of an asymmetric key pair;
    receiving the first encryption key from the decryption server;
    decrypting an encrypted second encryption key using the first encryption key to produce a second encryption key; and
    decrypting the encrypted data using the second encryption key to produce data.

2. The method of claim 1, further comprising:
    storing the data in a memory associated with the processing device; and
    mounting the drive to a mounting point to provide the data to the processing device.

3. The method of claim 1, further comprising:
    prior to receiving the first request,
    encrypting the data using the second encryption key to produce the encrypted data;
    encrypting the second encryption key using the first encryption key to produce the encrypted second encryption key; and
    encrypting the first encryption key using the public key of the asymmetric key pair to produce the encrypted first encryption key.

4. The method of claim 3, further comprising:
    responsive to producing the encrypted first encryption key, deleting the first encryption key and the second encryption key.

5. The method of claim 3, further comprising:
    storing the encrypted first encryption key, the encrypted second encryption key, and the encrypted data on the encrypted portion of the drive.

6. The method of claim 1, wherein the private key of the asymmetric key pair is stored, by another processing device associated with the decryption server, in a storage device.

7. The method of claim 6, wherein the second request comprises an identifier to associate a user account to the private key stored in the storage device.

8. The method of claim 7, wherein the decryption server is to:
    retrieve, in view of the identifier, the private key from the storage device; and
    decrypt the encrypted first encryption key using the private key of the asymmetric key pair to produce the first encryption key.

9. A non-transitory machine-readable storage medium storing instructions which, when executed, cause a processing device to:
    receive, by the processing device, a first request to decrypt encrypted data stored on an encrypted portion of a drive;
    transmit, to a decryption server, a second request comprising an encrypted first encryption key, wherein the encrypted first encryption key is produced by encrypting a first encryption key using a public key of an asymmetric key pair;
    receive the first encryption key from the decryption server;
    decrypt an encrypted second encryption key using the first encryption key to produce a second encryption key; and
    decrypt the encrypted data using the second encryption key to produce data.

10. The non-transitory machine-readable storage medium of claim 9, wherein the processing device is further to:
    store the data in a memory associated with the processing device; and
    mount the drive to a mounting point to provide the data to the processing device.

11. The non-transitory machine-readable storage medium of claim 9, wherein the processing device is further to:
    prior to receiving the first request,
    encrypt the data using the second encryption key to produce the encrypted data;
    encrypt the second encryption key using the first encryption key to produce the encrypted second encryption key; and
    encrypt the first encryption key using the public key of the asymmetric key pair to produce the encrypted first encryption key.

12. The non-transitory machine-readable storage medium of claim 11, wherein the processing device is further to:
    responsive to producing the encrypted first encryption key, delete the first encryption key and the second encryption key.

13. The non-transitory machine-readable storage medium of claim 9, wherein the processing device is further to:
    store the encrypted first encryption key, the encrypted second encryption key, and the encrypted data on the encrypted portion of the drive.

14. The non-transitory machine-readable storage medium of claim 9, wherein the private key of the asymmetric key pair is stored, by another processing device associated with the decryption server, in a storage device.

15. The non-transitory machine-readable storage medium of claim 14, wherein the second request comprises an identifier to associate a user account to the private key stored in the storage device, and wherein the decryption server is to retrieve, in view of the identifier, the private key from the storage device and decrypt the encrypted first encryption key using the private key of the asymmetric key pair to produce the first encryption key.

16. A system comprising:
   a memory; and
   a processing device, operatively coupled to the memory, the processing device to:
      receive a first request to decrypt encrypted data stored on an encrypted portion of a drive;
      transmit, to a decryption server, a second request comprising an encrypted first encryption key, wherein the encrypted first encryption key is produced by encrypting a first encryption key using a public key of an asymmetric key pair;
      receive the first encryption key from the decryption server;
      decrypt an encrypted second encryption key using the first encryption key to produce a second encryption key; and
      decrypt the encrypted data using the second encryption key to produce data.

17. The system of claim 16, wherein the processing device is further to:
   store the data in the memory associated with the processing device; and
   mount the drive to a mounting point to provide the data to the processing device.

18. The system of claim 16, wherein the processing device is further to:
   prior to receiving the first request,
   encrypt the data using the second encryption key to produce the encrypted data;
   encrypt the second encryption key using the first encryption key to produce the encrypted second encryption key; and
   encrypt the first encryption key using the public key of the asymmetric key pair to produce the encrypted first encryption key.

19. The system of claim 18, wherein the processing device is further to:
   responsive to producing the encrypted first encryption key, delete the first encryption key and the second encryption key.

20. The system of claim 16, wherein the processing device is further to:
   store the encrypted first encryption key, the encrypted second encryption key, and the encrypted data on the encrypted portion of the drive.

* * * * *